United States Patent
Wenke et al.

(10) Patent No.: US 7,559,152 B2
(45) Date of Patent: Jul. 14, 2009

(54) METHOD FOR DETERMINING THE POSITION OF A MILLING TOOL AND A MACHINING HEAD DESIGNED FOR CARRYING OUT THE METHOD

(75) Inventors: Stephan Wenke, Neustadt a. Rbg. (DE); Andreas Klocke, Lemgo (DE); Boris Heuer, Hannover (DE)

(73) Assignee: LPKF Laser & Electronics AG, Garbsen (DE)

( * ) Notice: Subject to any disclaimer, the term of this patent is extended or adjusted under 35 U.S.C. 154(b) by 687 days.

(21) Appl. No.: 11/360,292

(22) Filed: Feb. 23, 2006

(65) Prior Publication Data

US 2006/0185144 A1    Aug. 24, 2006

(30) Foreign Application Priority Data

Feb. 24, 2005    (DE)    ........................ 10 2005 008 878

(51) Int. Cl.
B27G 23/00    (2006.01)
(52) U.S. Cl. ........................................... 33/636; 33/638
(58) Field of Classification Search .................. 33/632, 33/636, 638, 639, 642, 643
See application file for complete search history.

(56) References Cited

U.S. PATENT DOCUMENTS

| 3,171,327 | A | | 3/1965 | Williamson |
|---|---|---|---|---|
| RE25,956 | E | | 2/1966 | Williamson |
| 3,241,451 | A | | 3/1966 | Williamson |
| 3,419,963 | A | * | 1/1969 | Williams ...................... 33/642 |
| 4,652,188 | A | * | 3/1987 | Augsburger .................. 33/644 |
| 4,778,313 | A | * | 10/1988 | Lehmkuhl ..................... 33/559 |
| 5,219,379 | A | * | 6/1993 | Good et al. ................... 33/642 |
| 6,438,856 | B1 | * | 8/2002 | Kaczynski .................... 33/503 |
| 6,531,080 | B1 | | 3/2003 | Ehrfeld et al. ............. 264/139 |
| 6,625,894 | B1 | * | 9/2003 | Kovach et al. ................ 33/201 |
| 7,367,087 | B2 | * | 5/2008 | Colombo et al. ............. 33/21.4 |
| 2007/0068020 | A1 | * | 3/2007 | Adrian ......................... 33/286 |

FOREIGN PATENT DOCUMENTS

| DE | 1477578 | 8/1969 |
|---|---|---|
| DE | 40 30 176 | 3/1992 |
| DE | 197 09 136 | 9/1998 |
| DE | 103 45 993 | 5/2005 |

* cited by examiner

*Primary Examiner*—G. Bradley Bennett
(74) *Attorney, Agent, or Firm*—Darby & Darby

(57) ABSTRACT

A method for determining the position of a milling tool for micro-structuring a substrate relative to a machining head, the machining head including a tool holder securing the milling tool, includes placing the milling tool against a reference surface of the substrate, opening the tool holder to enable an axial mobility of the milling tool relative to the machining head, and moving the machining head relative to the reference surface until a predetermined distance between the machining head and the reference surface is reached.

10 Claims, 1 Drawing Sheet

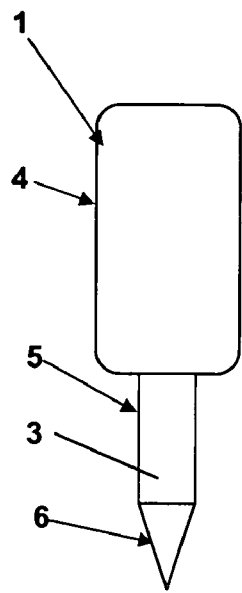
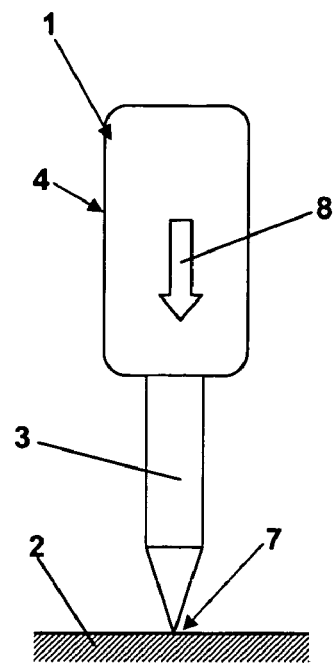
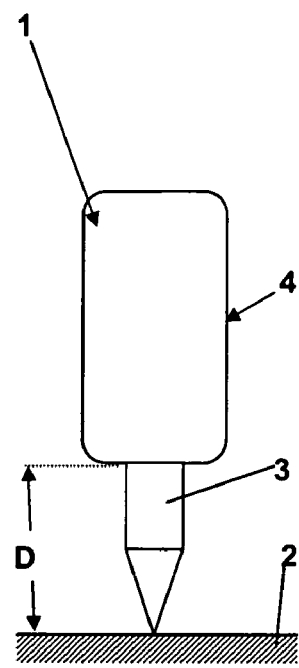
Fig. 1  Fig. 2  Fig. 3
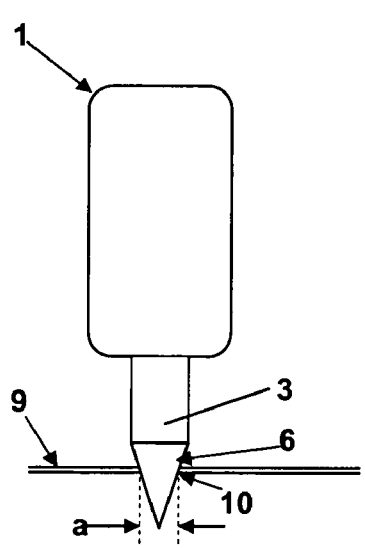
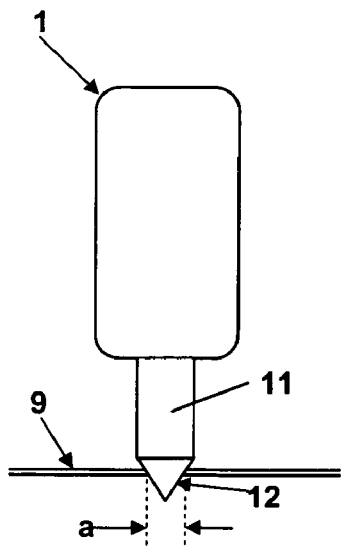
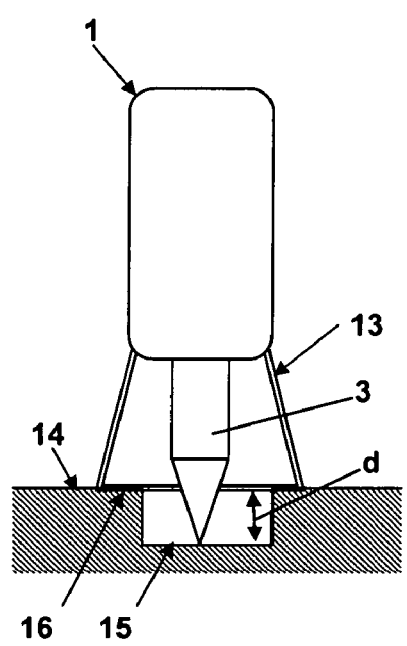
Fig. 4  Fig. 5  Fig. 6

METHOD FOR DETERMINING THE POSITION OF A MILLING TOOL AND A MACHINING HEAD DESIGNED FOR CARRYING OUT THE METHOD

Priority is claimed to German Patent Application No. DE 10 2005 008 878.3, filed Feb. 24, 2005, the entire disclosure of which is incorporated by reference herein.

The present invention relates to a method for determining the position of a milling tool for micro-structuring a substrate relative to a machining head that secures the milling tool by means of a tool holder, in which method the milling tool is placed against a reference surface. Moreover, the invention relates to a machining head designed for carrying out the method, having a holder for the milling tool for micro-structuring a substrate, whereby a machining position that axially secures the milling tool can be set as desired.

BACKGROUND

Such milling tools are used in actual practice in order to produce prototypes for printed circuit boards. Here, data from a CAD program can be directly converted into control data for the machining head of the milling tool so that a functional printed circuit board can already be made within a short period of time. A galvanic treatment is not necessary here since the structures are created directly by milling off part of the conductive substrate surface by means of the milling tool. In order to set the width of the track to be milled off, the penetration depth of the tapered milling tool used for this purpose can be changed by varying the distance.

The prior-art methods are capable of creating structures with a conductor track spacing and a conductor track width of 100 μm as well as a bore diameter of 150 μm. The areas of application are very multifaceted. For example, differing rigid and flexible materials as well as soft substrates known from HF and microwave technology can be processed into prototypes that are then virtually ready for serial production.

Prototypes that can be reproduced as often as desired can be made within a very short period of time and are thus available either for testing or for small-volume production. Moreover, it is very easy to mill cutouts in the printed circuit boards or else to cut printed circuit boards out of the base material—even with complex contours—and the same holds true for the production of masking lacquer for printed circuit board prototypes.

Depending on the application purpose, different milling tools, especially with different total lengths, can be used in actual practice. For this reason, before the machining of the substrate is started, the distance between the milling tool tip and the milling head has to be determined, particularly in order to be able to set the penetration depth of the milling tool with reproducible precision.

For this purpose, for example, it is a known procedure to move the milling head that secures the milling tool so that it comes into contact with a touch sensor, for instance, a momentary-contact switch, by means of which a signal to a control unit is triggered when contact is made. The position of the milling tool derived from this is then taken as the reference value, especially for the Z-axis of the subsequent machining step.

Moreover, it is already a known procedure to place the milling tool that is secured on the milling head against an electrically conductive element. A corresponding signal is triggered as soon as a sensor detects a flow of current between the conductive element and the milling tool.

Within the scope of a method and a device for the measurement and fine adjustment of a tool in a tool holder according to German patent application DE 103 45 993 A1, on the basis of the actual position that was detected and of the corrected tool position that was determined by calculation, a correction is made by means of a fine adjustment of the tool in the tool holder. Piezoelectrically active micro-actors, for example, are employed for this purpose. Here, the tool is moved by means of the actors, together with the tool holder that secures the tool.

German patent application DE 40 30 176 A1 describes a method for calibrating a tool. For this purpose, the tool is moved from a starting position to a reference surface until contact is made with it. Upon contact, the occurring audio signals are detected and subsequently converted into electric signals. These are then fed to a computing unit in order to determine a precise starting position of the machining tool with respect to the workpiece or to determine a correction parameter for the tool advance that takes into account the detected starting position.

Moreover, German patent application DE 197 09 136 A1 relates generally to a method for micro-structuring a substrate with a milling tool.

SUMMARY OF THE INVENTION

In actual practice, it has turned out to be disadvantageous that the known methods entail a considerable amount of effort in actual use. Moreover, it cannot be ruled out that the milling tool will be damaged in actual practice when it comes into physical contact with the conductive element.

Moreover, on the basis of the detected position of the milling tool, it is necessary to determine a correction value that is incorporated into the control program of the milling head. In addition, a collision simulation has to be carried out, especially if the substrate that is to be machined has a contoured or arched surface, and this is a procedure that entails additional effort.

An object of the present invention is to provide a way to considerably simplify the determination of the position of a milling tool for micro-structuring a substrate. A further or alternate object is to provide a machining head designed for carrying out the method.

Thus, according to the invention, with this method, when the milling tool is in a position where it lies against the reference surface, the axial mobility of the milling tool in the tool holder, which has been opened for this purpose, is set relative to the machining head and subsequently the machining head is moved relative to the reference surface until a predetermined distance between the machining head and the reference surface is reached. In this manner, it is possible for the first time to establish a predetermined distance of the machining head with respect to the reference surface and thus also with respect to the substrate that is to be machined with different milling tools, so that there is no need to calculate a correction value for the movement trajectory of the machining head. Thus, according to the invention, the machining head moves independently of the design, especially of the length of the milling tool, along a constant machining path, as a result of which the method is considerably simplified. For this purpose, the milling tool is held in a stationary position determined by the reference surface, while the machining head, along with its tool holder that has been opened for this purpose, is moved with respect to the milling tool and with respect to the reference surface until the desired, predetermined position has been reached.

The tool holder could hold the milling tool, especially frictionally, in the position that has been thus predetermined. However, it is especially advantageous for the milling tool to be secured non-positively in the tool holder in the desired position at a predetermined distance between the machining head and the reference surface. In this manner, the predetermined position of the milling tool is reliably retained during the subsequent machining of the substrate. In addition, it is also conceivable for the milling tool to be secured positively. Here, numerous generally known collet chucks are suitable as the holder for the milling tool, whereby a displacement from the predetermined position that might be caused by the closing of the collet chuck has to be taken into account.

As a matter of principle, the milling tool could be temporarily secured to the reference surface in such a way that the distance between the milling tool tip and the machining head could be increased by a movement in a direction facing away from the milling tool tip, so that the predetermined position can be set. In contrast, it is especially advantageous for the machining head to be moved in the direction of the reference surface and thus for the milling tool, which is stationarily secured with respect to the reference surface, to be inserted into the tool holder. As a result, a stop is sufficient as the reference surface since an additional guide for the milling tool is not necessary. Rather, the milling tool, which is held so that it can slide in the tool holder, can only be moved with one degree of freedom. This greatly simplifies the method.

An especially advantageous embodiment of the method is achieved when the axial extension of the milling tool is placed against the reference surface. In this manner, the penetration depth of the milling tool into the substrate remains constant for different milling tools during the milling process, so as to thus allow a reliable milling off of part of the conductive layer. The method is equally suited for conical as well as for cylindrical milling tools whose front faces are placed against the reference surface.

Another likewise especially practical variant is also realized when the milling tool having a conical section is placed with its circumference against an edge area of a recess of the reference surface. This yields a constant milling width for the distance between the machining head and the reference surface that has been predetermined in this manner, so as to ensure a reliable insulation due to a suitable milling width, especially in the case of conductor tracks.

In order to set the desired distance between the machining head and the reference surface, the machining head can be lowered until the milling tool has been inserted to the desired extent into the tool holder. All that is necessary for this purpose is to determine the particular position of the machining head by means of a measurement that takes the position of the reference surface into consideration. In contrast, it is especially simple if the machining head has a milling depth limiter that is placed against the reference surface in order to set a predetermined distance, so that the distance is determined by the dimensions of the milling depth limiter. As a result, the setting can be reproduced at will. Moreover, in this manner, the distance is determined directly on the basis of the milling depth limiter employed during the machining procedure, so that there is no need to determine the distance as a measured variable.

For this purpose, it is particularly practical for the reference surface to have two planes for establishing a predetermined distance between the milling depth limiter and the maximum extension of the milling tool. For example, the first plane is formed by the base of a recess, for example, a pocket, while the second plane is formed by the edge area of the recess that protrudes therefrom.

A likewise especially advantageous embodiment of the present invention is also achieved when the tool holder is opened in a position above the reference surface, so that the milling tool slides axially in the tool holder down to the reference surface under the effect of gravity. Consequently, in a simple manner, a defined axial displacement out of the tool holder is achieved, limited by the reference surface that forms a stop, and this displacement is followed by the defined sliding of the milling tool into the tool holder. Hence, the predetermined position is also reliably reached with milling tools having a relatively short axial extension.

In contrast, with another, likewise especially practical variant of the invention, the milling tool is moved relative to the tool holder towards the reference surface by means of a spring element in order to also allow, for example, a positioning of the milling tool in an overhead position or in a position in which the reference surface diverges from the horizontal position, for example, when it is oriented vertically. Here, the spring element or a drive that can be actuated, for example, by means of air pressure, effectuates the axial displacement in the direction of the reference surface.

The present invention also provides a machining head designed for carrying out the method that includes a tool holder for the milling tool for micro-structuring a substrate. According to the present invention, at least one released position that causes a guided axial sliding can be set with a tool holder of the machining head that has been opened for this purpose. In this manner, the milling tool in the released position, especially vertically above the reference surface, can be made to slide down to the reference surface under the effect of gravity, whereby the sliding guidance ensures one single degree of freedom. After the desired relative position between the machining head and the milling tool has been set, the milling tool is secured in the tool holder in the machining position.

The invention allows various embodiments.

BRIEF DESCRIPTION OF THE DRAWINGS

One embodiment of the present invention will be described in more detail below with reference to the drawings, in which:

FIG. 1 a milling tool secured in a tool holder of a machining head;

FIG. 2 the machining head shown in FIG. 1, with the milling tool placed against the reference surface;

FIG. 3 the machining head lowered in comparison to FIG. 2, with a milling tool inserted into the tool holder;

FIG. 4 the machining head shown in FIG. 3, whereby the circumference of the milling tool lies against an edge area of a recess;

FIG. 5 a milling tool that differs from FIG. 4 and whose circumference lies against an edge area of a recess;

FIG. 6 a machining head fitted with a milling depth limiter.

DETAILED DESCRIPTION

FIG. 1 shows a machining head 1 for micro-structuring a substrate 2 shown in FIGS. 2 and 3 that secures a milling tool 3 in a tool holder 4. The milling tool 3 has a shaft 5 as well as a conical cutting head 6. The particular length of the milling tool 3 can be dimensioned differently and the milling tool can have different designs.

In order to achieve a simple machining of the substrate 2 with different milling tools 3, particularly without the need for a correction of the milling program, the milling tool 3, as shown in FIG. 2, under the effect of gravity or a spring element (not shown here), is first placed against a reference surface 7 formed by an area of the substrate 2. Here, the securing force of the non-positive tool holder 4 is set in such a way that the milling tool 3 can be moved with respect to the tool holder 4 that is configured as a collet chuck. Consequently, the machining head 1 can be lowered onto the substrate 2 in the direction indicated by the arrow 8, whereby the milling tool 3 slides into the tool holder 4 until the predetermined distance D between the machining head 1 and the substrate 2 has been reached, as shown in FIG. 3. This distance D is determined correspondingly for different milling tools 3 so that the milling depth that is achieved in the machining process is the same even for different milling tools 3.

In contrast, FIGS. 4 and 5 show another design of a reference surface 9 that can likewise be formed, for example, by an area of the substrate. Here, the milling tool 3 shown in FIGS. 1 to 3 is placed with the circumference of its conical cutting head 6 against an edge area of a recess 10 at a width a of the reference surface 9. FIG. 5 shows a milling tool 11 that has been modified in comparison to FIG. 4, whose conical cutting head 12 has a much smaller pitch. Due to the recess 10 having the width a, the milling width in the substrate that is to be machined is constant for both milling tools 3, 11 at a distance between the machining head 1 and the reference surface 9 that has been predetermined in this manner.

FIG. 6 shows the machining head 1 that is fitted with a milling depth limiter 13 and that allows an even more simplified setting of the particular position of the machining head 1. In order to set a predetermined distance d between the milling depth limiter 13 and the milling tool 3, the milling depth limiter 13 is placed against the reference surface 14. For this purpose, the reference surface 14 has two planes 15, 16, whereby the lower plane 15, through a pocket-like depression for holding the milling tool 3 and the upper plane, through an edge that encloses the depression for placing the milling depth limiter 13, serve to establish the predetermined distance d. This distance d is thus geometrically determined by the dimensions of the milling depth limiter 13 so that there is no need for a measurement of the distance.

What is claimed is:

1. A method for determining the position of a milling tool for micro-structuring a substrate relative to a machining head, the machining head including a tool holder securing the milling tool, the method comprising:
    placing the milling tool against a reference surface of the substrate;
    opening the tool holder to enable an axial mobility of the milling tool relative to the machining head; and
    moving the machining head relative to the reference surface until a predetermined distance between the machining head and the reference surface is reached.

2. The method as recited in claim 1, further comprising securing the milling tool non positively in the tool holder at the predetermined distance between the machining head and the reference surface.

3. The method as recited in claim 1, wherein the moving of the machining head is performed in a direction of the reference surface so that the milling tool, which is stationarily secured with respect to the reference surface, is inserted into the tool holder.

4. The method as recited in claim 1, wherein the placing of the milling tool is performed so that an axial extension of the milling tool contacts the reference surface.

5. The method as recited in claim 1, wherein the milling tool has a conical section and the reference has a recess, and wherein the placing of the milling tool is performed so that a circumference of the conical section contacts an edge area of the recess.

6. The method as recited in claim 1, wherein the opening of the tool holder is performed before the placing the milling tool against the reference surface and in a position above the reference surface, so that the milling tool slides axially in the tool holder down to the reference surface under the effect of gravity.

7. The method as recited in claim 1, wherein the milling tool is moved relative to the tool holder towards the reference surface using of a spring element.

8. A device for micro-structuring a substrate, comprising:
    a milling tool;
    a machining head having a holder, the holder axially holding the milling tool at a machining position in a closed state, and enabling a guided axial sliding of the milling tool in an opened state, wherein the machining position is a predetermined axial distance from a surface of the substrate.

9. The device as recited in claim 8, wherein the machining head has a milling depth limiter disposed against the reference surface so as to set the predetermined distance.

10. The device as recited in claim 9, wherein the reference surface has two planes.

\* \* \* \* \*